(No Model.)

J. SLEETH & F. M. LUCAS.
CHUCK.

No. 271,941.  Patented Feb. 6, 1883.

Witnesses.
Robt. Johnston
W. H. Kern

Inventor.
Jas. Sleeth,
F. M. Lucas,
per
F. A. Lehmann, Atty.

N. PETERS, Photo-Lithographer, Washington, D. C.

UNITED STATES PATENT OFFICE.

JAMES SLEETH AND FRANCIS M. LUCAS, OF MORRISTOWN, INDIANA.

CHUCK.

SPECIFICATION forming part of Letters Patent No. 271,941, dated February 6, 1883.

Application filed July 31, 1882. (No model.)

*To all whom it may concern:*

Be it known that we, JAMES SLEETH and FRANCIS M. LUCAS, of Morristown, in the county of Shelby and State of Indiana, have invented certain new and useful Improvements in Chucks; and we do hereby declare the following to be a full, clear, and exact description of the invention, such as will enable others skilled in the art to which it pertains to make and use it, reference being had to the accompanying drawings, which form part of this specification.

Our invention relates to an improvement in chucks; and it consists in the arrangement and combination of parts that will be more fully described hereinafter.

The object of our invention is to provide jaws for chucks which are made in two parts, one of which parts can be removed at any time and a different tool substituted for it, according to the kind of work that is to be done, and thus adapt the chuck to different uses.

Figure 1:
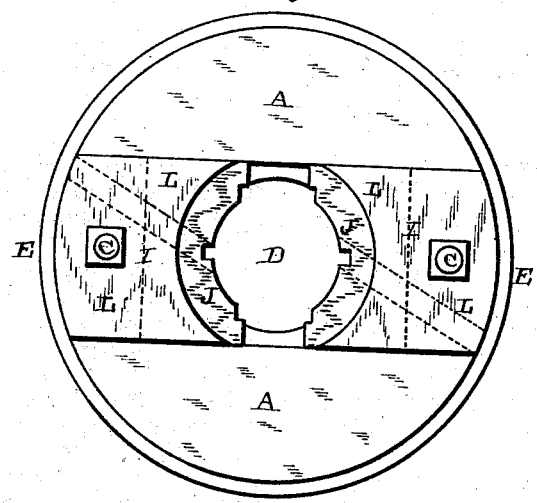
Figure 2:
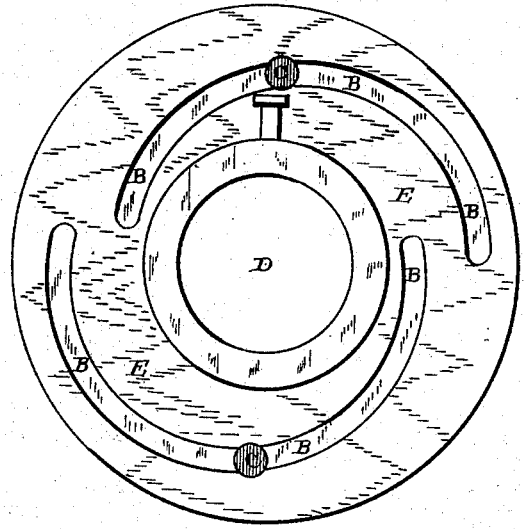
Figure 3:
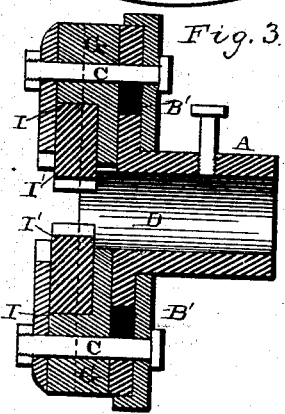

Figure 1 is the front view of a chuck embodying our invention. Fig. 2 is a rear view. Fig. 3 is a vertical section.

A represents the body of the chuck, which is provided with the two slots B', through which the clamping-bolts C pass for holding the jaws in position. Across the front face of the chuck is made a deep groove, in which the sliding jaws are placed, and through the center of the body of the chuck is made the hole D. Applied to the rear side of this chuck is the plate E, which has two spiral slots, B, made through it, and through which the clamping-bolts pass, and is provided with a flange to catch over the edge of the body A. When this plate is turned the spiral slots act as wedges and force the clamping-bolts, and the jaws connected with them, either inward toward each other or outward toward the outer edge of the body, as may be desired.

The jaws G are cut away at their inner ends, so as to have a shoulder, I, formed upon them to receive the tool or cutting device which is to be used. Across the face of each jaw there is made a diagonal groove in which a cutting-tool of any kind may be placed, and a continuation of this groove is also made in the removable pieces I', which complete the jaws. When it is not desired to use the cutting-tools they are removed, together with the parts I', and then a die, J, for cutting screw-threads, may be substituted in its place. These parts I J are secured in place upon the shoulder formed in the jaw by means of a removable cap-piece, L, which is secured in place by means of a nut or other suitable device applied to the end of the clamping-bolt. By thus making the center part of the jaws removable it will readily be seen that different tools can be applied to the jaws, and thus a greater variety of work done with the same chuck. In case it is desired to use the chuck in drilling holes, the cutting device can be removed from the jaws G, and then the drill will be clamped between the grooved inner ends of the jaws, or held in any other way that may be preferred.

This invention is specially adapted for cutting away shoulders upon the outer ends of spindles, for cutting the screw-thread upon that part of the spindle which has been cut away, and for removing the outer screw-threaded ends of the spindle a corresponding distance to that which has been cut away at the shoulder. A person having one of these devices can readily repair the spindles of buggies and carriages, so as to take up the wear caused by the friction of the wheel, and thus do away with all necessity for washers.

Having thus described our invention, we claim—

1. In a chuck, the combination of the grooved jaws G and the grooved tools I', the grooves in the two parts being made to form a continuous groove to receive a cutting-tool, substantially as shown.

2. In a chuck, the combination of the body A, having the slots B', the jaws G, cutting-tools I', cap-piece L, the plate E, having slots B, and the bolts C, substantially as set forth.

In testimony whereof we affix our signatures in presence of two witnesses.

JAMES SLEETH.
FRANCIS MARION LUCAS.

Witnesses:
WM. H. WEBSTER,
JOSEPH SLEETH.